United States Patent

[11] 3,590,362

[72] Inventor Robert J. Kakalec
  Madison, N.J.
[21] Appl. No. 860,503
[22] Filed Sept. 24, 1969
[45] Patented June 29, 1971
[73] Assignee Bell Telephone Laboratories, Incorporated
  Murray Hill, N.J.

[54] DC TO DC CONVERTER CIRCUIT WITH LOAD VOLTAGE REGULATION UTILIZING A CONTROLLED SIMULATED SATURATING CORE
8 Claims, 4 Drawing Figs.

[52] U.S. Cl. .................................................. 321/45 R,
  321/18, 321/68, 331/113 A
[51] Int. Cl. .................................................. H02m 7/48
[50] Field of Search .................................................. 321/2, 45;
  331/113.1

[56] References Cited
UNITED STATES PATENTS

| | | | |
|---|---|---|---|
| 3,210,690 | 10/1965 | Mokrytzki et al. | 331/113(.1) |
| 3,317,856 | 5/1967 | Wilkinson | 321/45 X |
| 3,403,319 | 9/1968 | Tate | 331/113(.1) X |
| 3,466,570 | 9/1969 | Webb | 321/2 X |
| 3,487,335 | 12/1969 | Lingle | 321/2 X |

OTHER REFERENCES

Geyger, William A., "Frequency Control of Magnetic Multivibrators," ELECTRONICS, July 24, 1959, pp. 54— 56 (copy in 331/113.1)

*Primary Examiner*—William M. Shoop, Jr.
*Attorneys*—R. J. Guenther and E. W. Adams, Jr.

ABSTRACT: An inverter circuit driving a ferroresonant regulator utilizes a feedback controlled switching frequency arrangement to regulate its output voltage with respect to both line and load conditions. A deviation in the output voltage alters the switching frequency of the inverter by altering the simulated saturation of a switching control transformer core included in the inverter circuit. The output voltage of the ferroresonant regulator, which is proportional to the inverter frequency, is adjusted to some regulated value. Saturation of the inverter transformer is simulated by controlling the volt-time area of the output voltage waveform of the inverter transformer.

3,590,362

INVENTOR
R.J. KAKALEC
BY Alfred Steinmetz
ATTORNEY

DC TO DC CONVERTER CIRCUIT WITH LOAD VOLTAGE REGULATION UTILIZING A CONTROLLED SIMULATED SATURATING CORE

BACKGROUND OF THE INVENTION

This invention relates to converter circuits and more particularly to free running static inverter circuits and is primarily concerned with regulation of the output voltage of the converter circuit by controlling the inverter switching frequency.

Static inverter circuits normally comprise power oscillators utilized to convert a DC voltage to a sinusoidal or square wave AC voltage. These inverters may include a line regulator and be coupled with a subsequent rectifier circuit to provide a converter capable of converting a DC voltage from one voltage level to another voltage level. Such static inverters are frequently embodied in a push-pull type configuration for applications involving moderate power levels. The push-pull type inverter circuit comprises two alternately operated switching devices. These switching devices are alternately switched into conduction and enable alternate current paths. The alternate current paths supply current to alternately magnetize a transformer core in opposite directions. Feedback from the transformer controls the switching of the switching devices.

The push-pull type inverter may be operated in two modes. In one mode the inverter is operated so that the transformer is magnetized within its linear range. In the second and preferred mode of operation, the transformer is magnetized to saturate in opposite directions during each cycle of operation. The frequency at which the inverter switches in the second mode is controlled by the voltage magnitude of the energizing source and the characteristics of the saturating transformer. For a given saturating transformer, the output voltage magnitude generated by the inverter is directly proportional to the frequency of the saturation of the core.

Inverters are not suitable as a power supply where a very precise regulated output voltage is desired. The inverter switching frequency is sensitive to the magnitude of the supply voltage which energizes the inverter. If the supply voltage varies slightly, the frequency at which the inverter operates also varies and, in the case of the inverter utilizing saturating cores, the amplitude of the output voltage varies. In addition, the typical saturating transformer-type inverter does not readily permit regulation of the output voltage if the load current changes.

At present the switching frequency of inverters utilizing saturating cores is regulated by carefully regulating the DC supply voltage used to energize the inverter. A subsequent independent regulator circuit is used to regulate the output voltage of the inverter with respect to the load. Converter systems incorporating inverters and independent auxiliary regulators, however, are complex and in addition do not permit easy adjustment because the saturation characteristics of the saturating transformer of the inverter are fixed.

It is therefore an object of the invention to regulate the output voltage of a converter including a free running inverter circuit with respect to line voltage and output load current changes.

It is another object of the invention to control the frequency of an inverter circuit independently of variations in the supply voltage energizing the inverter.

SUMMARY OF THE INVENTION

Therefore, in accord with the invention, regulation of the output voltage supplied by a converter is accomplished by controlling the switching frequency at which the included inverter circuit operates. The inverter drives a ferroresonant regulator whose output voltage is proportional to the switching frequency of the inverter. The frequency control is accomplished by varying the simulated saturating characteristics of the inverter transformer in response to changes in the output voltage of the ferroresonant regulator.

In a particular converter disclosed herein as illustrative of the principles of the invention, a saturating core-type inverter circuit includes an integrator circuit arrangement with a variable integration constant to integrate the voltage output of the inverter transformer. The integrator controls a gate which shunts the windings of the inverter transformer. The gate is triggered into conduction by the integrator upon the attainment of a volt-time integral determined by the integration constant of the integrator. The conducting gate shorts out the windings of the inverter transformer simulating saturation therein. A linear inductor included in series with the conducting gate supplies the reverse voltage to initiate switching in the inverter circuit. The variable integration constant is adjusted in response to changes in the output voltage of the converter. By thus controlling the variable integration constant the inverter frequency is altered and in combination with the ferroresonant regulator regulates the output voltage of the converter.

In the particular embodiment herein, line and load regulation are combined by including a ferroresonant regulator wound on the same core as the inverter transformer and isolated therefrom by magnetic shunts. Feedback from the output of the ferroresonant regulator is utilized to vary the aforementioned integration constant.

BRIEF DESCRIPTION OF THE DRAWINGS

Many objects, advantages and features of the invention in addition to those enumerated above will become readily apparent upon examination of the attached drawings in combination with the following detailed specification wherein.

DETAILED DESCRIPTION

Figure 1:
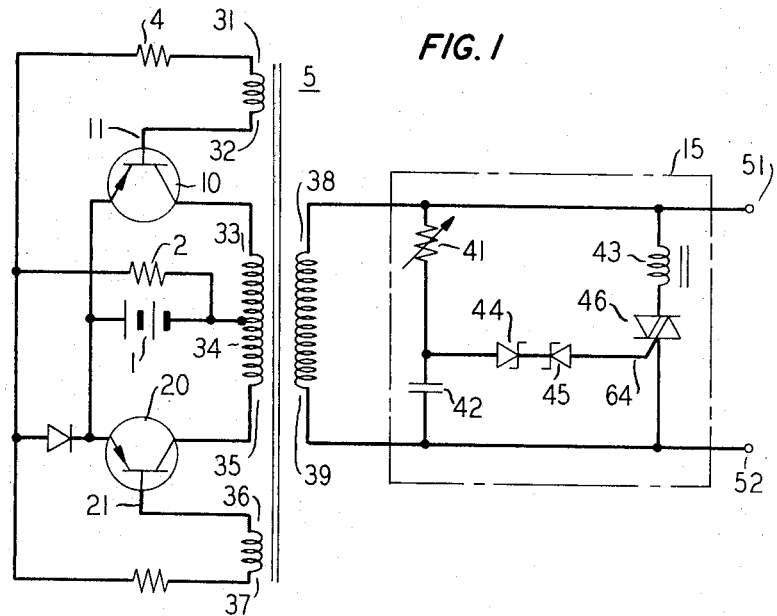
FIG. 1 is a schematic diagram of an inverter with simulated saturation of its transformer core.

The inverter in FIG. 1 is energized by voltage supplied by an unregulated voltage source 1 which may comprise a battery or suitable substitute therefor. The inverter by alternately switching the two switching transistors 10 and 20 into conduction, and thereby alternately magnetizing the transformer core 5 in opposing directions, supplies an alternating voltage at the output terminals 51 ad 52. The output voltage waveform takes the form of a square wave. The core of transformer 5 of the inverter, while operating within its linear magnetization range, responds to a saturation simulation circuit 15 to simulate the performance of a saturating transformer. The simulated saturation of the core of transformer 5 is accomplished by controlling the volt-time area of the output voltage waveform of the transformer. The operation of the circuit of FIG. 1 may be readily explained by describing a typical cycle of its operation.

It is assumed herein for the purposes of explanation that the inverter circuit is operating in its steady state condition. The starting operation of the typical inverter circuit depends on the use of a special starting circuit or on the existence of an unbalance in the two switching devices of a push-pull arrangement. The starting operation of inverters is well detailed in the technical literature and hence it is not believed necessary to describe this process herein.

Initially, consider the switching transistor 10 to be in its saturated conducting state and the switching transistor 20 to be in its cutoff or nonconducting state. A current in response to the voltage source 1 flows through the collector-emitter path of the switching transistor 10, through the transformer winding 33—34 back to the source 1. This current increases in magnitude until limited by the reflected impedance from the secondary of the transformer 5. As this current increases, a voltage is induced in the transformer winding 31—32 due to its mutual coupling with the transformer winding 33—34. This voltage derived from the winding 31—32 is applied to the base 11 of the switching transistor 10 and drives it further into its saturation state.

A voltage is generated in the transformer winding 38—39 due to the increase in current in the winding 33—34. The saturation simulation circuit 15 is shunted across the winding 38—39. Saturation is electronically simulated by shorting the transformer winding 38—39 and thereby abruptly reducing the output voltage to zero.

The saturation simulation circuit 15 includes an RC timing circuit shunting the winding 38—39. The RC timing circuit comprises the variable resistor 41 and the timing capacitor 42. The timing capacitor 42 is charged by current supplied from the winding 38—39. The rate at which the capacitor 42 charges is controlled by the resistance level to which the variable resistor 41 is set. A series connected inductor 43 and triac 46 also shunt the secondary winding 38—39. The capacitor 42 is coupled to the gate lead 64 of the triac 46 by two series connected and oppositely poled zerner diodes 44 and 45. The triac 46 operates functionally as would two silicon controlled rectifiers coupled in an inverse parallel connection and triggered into conduction by a common gate lead. The characteristics of the triac device are described for instance in the RCA Transistor Manual—Technical Series SC-13, 1967, pages 387—404, and it is not believed necessary to discuss the triac herein.

Upon the attainment of a predetermined charge level on the timing capacitor 42, the voltage thereon is sufficient to reverse bias one of the series connected pair of oppositely poled zener diodes 44 and 45. The oppositely poled zener diodes respond to the oppositely poled voltages generated in the transformer winding 38—39 and across capacitor 42 during successive half cycles.

When one of the zener diodes is reverse biased or breaks down the charge on the capacitor 42 is coupled to the gate lead 64 of the triac 46, thereby switching the triac 46 into a conducting state. With the triac 46 in a conducting state, the inductor 43 is shunted across its secondary winding 38—39. The inductor 43 is very low in impedance and hence for all practical purposes, the secondary winding 38—39 is shorted. Hence the voltage across the secondary winding 38—39 rapidly decays to a negligible level.

The inertial current characteristic of the inductor 43 induces a reverse voltage in the winding 38—39. This reverse voltage is applied, via the transformer winding 31—32, to the base 11 of the switching transistor 10 and rapidly switches it into its cutoff or nonconducting state. A voltage is also induced in the transformer winding 36—37 which is coupled to the base 21 of the switching transistor 20. This voltage rapidly biases the switching transistor 20 into a conducting state. When the inertial current flow through the inductor 43 ceases, the triac 46 switches into its nonconducting state.

With the switching transistor 20 switched into its conducting state, a current flows from the voltage source 1 through the collector-emitter path of switching transistor 20 and the transformer winding 34—35. As this current begins to increase in magnitude in the transformer winding 34—35, a voltage is induced in the transformer winding 36—37 causing the current therein to increase. This increasing current in transformer winding 36—37 is applied to the base 21 of the switching transistor 20 and biases the switching transistor 20 into a higher conducting state and eventually drives it into saturation.

As the current through transistor 20 increases a voltage is induced in the transformer winding 38—39 in a direction opposite to the voltage induced in this winding during the previous half cycle of operation. In response to this induced voltage, a current flows through the timing circuit to charge the timing capacitor 42 in a polarity opposite to the charging polarity of the previous half cycle of operation. When the timing capacitor 42 acquires a threshold charge sufficient to break down the oppositely poled one of the zener diodes 45 and 44, a triggering current is applied to the gate lead 64 of the triac 46 switching it into its conducting state.

With the triac 46 conducting, the inductor 43 is shunted across the winding 38—39 and, as described above, subsequently induces a reverse voltage in the winding 36—37. This reverse voltage biases the switching transistor 10 into its conducting state. It is apparent that the above-described switching cycle is repeated as the switching transistor 10 is again biased into its conducting state.

Figure 2A:
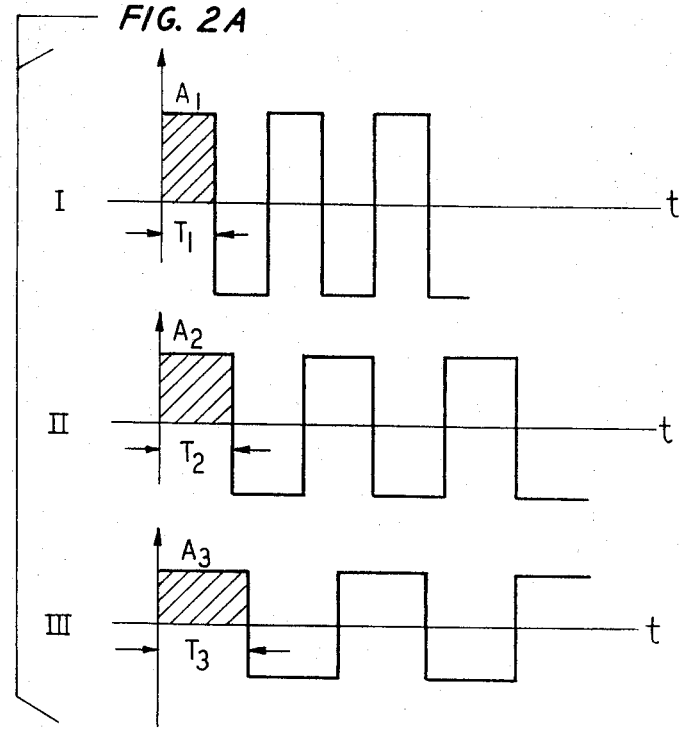
FIGS. 2A and 2B are waveforms comparing the output voltage characteristics of a conventional saturating core-type inverter and an inverter utilizing simulated saturation of its transformer according to the present invention.
Figure 2B:
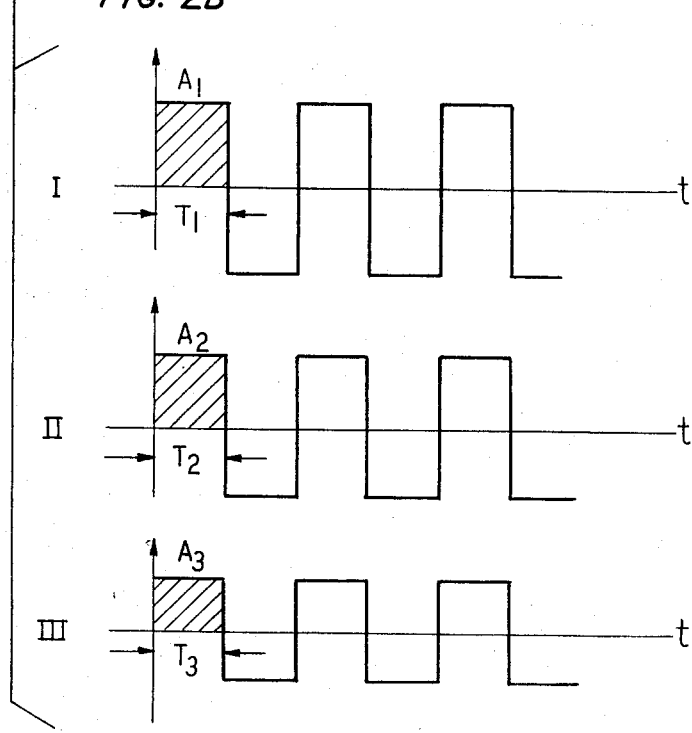

The output voltage waveforms of the above-described inverter, shown in FIG. 2B, is compared with the output voltage waveforms of a typical saturating core-type inverter, shown in FIG. 2A. Waveforms I, II, and III, in FIG. 2A represent the differing frequency response of a typical inverter using a saturable transformer to variations in the level of the supply voltage. As the supply voltage level decreases, as shown progressively by waveforms I, II, and III, the period of switching $T_1$, $T_2$, and $T_3$ increases resulting in a decreased frequency of operation. Because the saturation characteristics of the transformer core are fixed the volt-time areas $A_1$, $A_2$, and $A_3$ of waveforms I, II, and III are equal. In FIG. 2B, waveforms I, II, and III represent the adjustable response of an inverter embodying the principles of the invention to a decreasing supply voltage of the same magnitude as shown in FIG. 2A. The periods of switching $T_1$, $T_2$, and $T_3$ of the waveforms I, II, and III are maintained equal and the volt-time area of the output voltage decreases with the decreasing level of the supply voltage. The volt-time area of the output voltage is changed by controllably varying the integration constant of the saturation simulation circuit 15 as the supply voltage decreases.

It is apparent from the foregoing that the switching frequency of the inverter, according to the invention, may be adjusted by varying the rate at which the timing capacitor 42 charges. By controlling the switching frequency of the inverter in response to changes in the output voltage of the converter, the voltage output may be both line and load regulated by utilizing a single ferroresonant regulator as described below.

Figure 3:
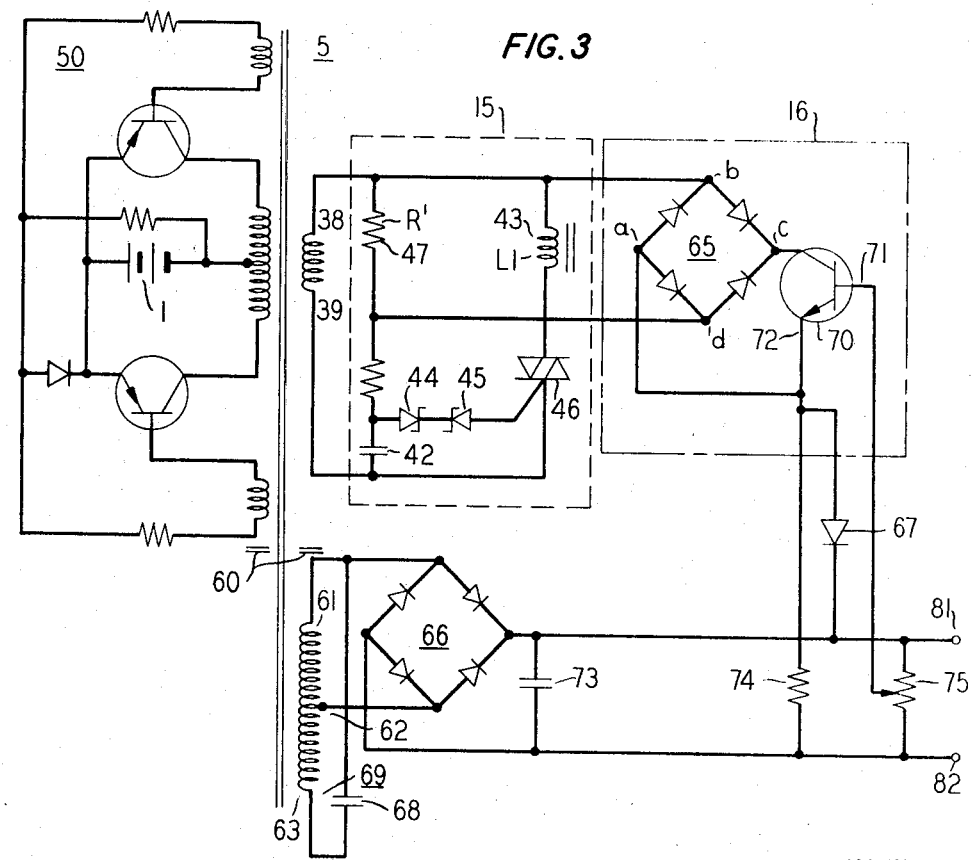
FIG. 3 is a schematic diagram of an illustrative embodiment of a converter according to the principles of the invention including a feedback circuit to permit load regulation of the voltage output of the converter.

The circuit arrangement shown in FIG. 3 regulates the output voltage of the converter derived from the inverter 50 by utilizing feedback from the output at the load to control the integration constant of the saturation simulation circuit 15. This feedback arrangement controls the charging rate of the timing capacitor 42 in order to regulate the output voltage supplied by the converter at output terminals 81 and 82.

In the illustrative embodiment shown in FIG. 3 the rectified output voltage at terminals 81 and 82 is derived from the saturating transformer winding 61—62, and the full wave rectifier diode bridge 66. Feedback control from the output terminals 81 and 82 to the saturation simulation circuit 15 is supplied, via the integration constant control circuit 16.

The integration constant control circuit 16 comprises a transistor 70 whose transconductive path connects the opposite terminals $a$ and $c$ of a bridge circuit 65. zener terminals $b$ and $d$ of the bridge circuit 65 shunt a zener value resistor 47 included in the charging path of the timing capacitor 42. The base 71 of the transistor 70 is connected to a potentiometer 75 shunting the output terminals 81 and 82. The emitter 72 of the transistor 70 is connected to the junction of the series connected Zener diode 67 and resistor 74 which together shunt the output terminals 81 and 82. The Zener diode 67 derives a reference voltage from the output voltage which is applied to the emitter 72. It is apparent from the foregoing description that variation in the output voltage will alter the emitter-base bias of transistor 70 and hence in turn alter the total resistive impedance in the charging path for the capacitor 42.

The inverter 50 switches at a frequency which is determined by the magnitude of the supply voltage supplied by voltage source 1 and the charging rate of the timing capacitor 42. The switching of the inverter 50 produces a square wave output signal which appears across the transformer winding 38—39. A slightly altered version of this waveform appears across the transformer winding 61—63. As described above, the saturation simulation circuit 15 integrates the voltage output of the transformer winding 38—39 and upon the attainment of a predetermined volt-time area of the voltage waveform connects the inductor 43 in parallel with the winding 38—39. The shunting of inductor 43 across winding 38—39 initiates the bias voltage reversal to cause the inverter 50 to switch the direction of magnetization in the core of transformer 5.

The volt-time area and frequency controlled square wave voltage output of winding 38—39 is magnetically coupled to the saturating winding 61—63 which is shunted by the capacitor 68. Together these components comprise a ferroresonant regulator 69. The magnetic shunts 60 provide sufficient isolation from the inverter transformer windings to permit winding 61—63 to saturate. The magnetic core structure of the winding 61—63 in the ferroresonant regulator 69 is saturated in opposite directions during each successive half cycle of operation. This saturation ensures that the flux linkage to the output winding 61—63 during each half cycle is fairly constant. The only variable that alters the output voltage is the frequency at which saturation occurs which is controlled by the inverter switching frequency. The capacitance of capacitor 68 is selected to be near resonance with the leakage inductive reactance derived from the magnetic shunt 60 at the normal operating frequency. The capacitor 68 causes the voltage across winding 61—63 to be increased and hence drives the core of winding 61—63 into saturation while the core of winding 38—39 remains unsaturated. The magnetic shunts 60 provide a magnetic path for the saturating flux to circulate independent of the core of winding 38—39. A full wave rectifier bridge 66 shunts the transformer winding segment 61—62, and rectifies the output waveform of the voltage thereon. The rectified voltage signal is filtered to reduce the ripple content by the capacitor 73 and is applied to output terminals 81 and 82 which may be coupled to a load circuit.

The operation of the feedback arrangement to regulate the output voltage on terminals 81 and 82 may best be explained by explaining the response of the inverter and feedback regulation circuit to a change in the input supply voltage energizing the inverter. For example, if the supply voltage 1 of the inverter 50 increases, its switching frequency will increase. This increase in switching frequency occurs because the increased voltage charges the timing capacitor 42 more rapidly to the voltage level at which the simulated saturation of winding 38—39 occurs. The average voltage level on the transformer winding 61—62 increases because the frequency at which saturation occurs increases. Hence, the fixed volt-time areas of the periodic output voltage waveforms on winding 61—62 are now generated at a higher frequency. Accordingly, the output voltage at terminals 81 and 82 increases in magnitude. As described hereinabove, the charging rate of the timing capacitor 42 and hence the volt-time area of the voltage output of the inverter 50 is controlled by the integration constant control circuit 16 which is responsive to the output voltage on terminals 81 and 82.

The zener diode 67 maintains the emitter 72 at a fixed reference voltage. Since the output voltage at terminals 81 and 82 has increased in magnitude, the voltage balance of the potentiometer 75 is altered and the resulting voltage applied to the base electrode of transistor 70 biases its transconductive path into a condition of higher impedance. By increasing the impedance of the transconductive or collector-emitter path of transistor 70, the resistance through which the capacitor 42 is charged is increased. It now takes longer for the capacitor 42 to acquire a sufficient charge to break down one of the zener diodes 44 and 45 and activate the triac 46. Hence, since the charging time is increased, the switching frequency of the inverter 50 is decreased. With the inverter switching frequency reduced, the output voltage supplied at the transformer winding 61—62 is decreased thereby lowering the output voltage of the converter to its desired regulated value. It is apparent that the aforedescribed feedback circuit will constantly control the switching frequency of the inverter 50 to maintain the regulated output voltage at terminals 81 and 82 at a fixed predetermined magnitude.

What I claim is:

1. A DC to DC converter comprising an inverter circuit including a transformer with a feedback primary winding and an output secondary winding, and means to control the switching frequency of said inverter, said means to control including a volt-time integrator to integrate the voltage across said output secondary winding, said volt-time integrator comprising a resistance with impedance adjustment means and a capacitor, a shunt path coupled across said output secondary winding, said shunt path including a low impedance linear inductive reactance and a semiconductor gate connected in series thereto, said semiconductor gate having a control electrode, means to activate said gate in response to a particular voltage magnitude across said capacitor including a voltage threshold breakdown diode coupling said capacitor voltage to said control electrode, said inductive reactance inducing a reverse voltage in said output secondary winding to initiate switching action in said inverter circuit when said gate is activated.

2. A DC to DC converter as defined in claim 1 wherein said transformer includes a saturating winding isolated from said inverter circuit and rectifying means to derive a voltage from said saturating winding.

3. A DC to DC converter as defined in claim 2 wherein a feedback arrangement responds to variation in the voltage output of said rectifying means to alter the impedance of said resistance.

4. A free running voltage regulated inverter circuit comprising two transistors, a transformer having a primary winding and first and second secondary windings, said transformer including a magnetic path common to said primary and said first secondary winding having linear magnetic characteristics and magnetic shunt means to separate said first and second secondary windings, said two transistors coupled to the primary winding of said transformer in a push-pull arrangement, means to simulate magnetic saturation in said first secondary winding of said transformer including an energy storage device, means to control the rate at which said energy storage device stores energy, an inductive reactor, gating means responsive to a predetermined energy level in said energy storage device to shunt said inductive reactor across said first secondary of said transformer, said second secondary winding wound on a magnetic path of said transformer having saturating characteristics, and feedback means from said second secondary winding to said means to control the rate whereby deviations in the voltage magnitude derived from said second secondary winding are utilized to adjust said means to control the rate to regulate the charging rate of said energy storage means which in turn controls the switching frequency of said inverter in order to regulate the voltage output of said second secondary winding.

5. A free running voltage regulated inverter circuit as defined in claim 4 wherein said means to control the rate comprises a variable impedance including a diode bridge coupled in parallel with a fixed impedance and a transistor whose collector-emitter path shunts opposite terminals of said diode bridge and whose base is coupled to the voltage output of said second secondary winding.

6. A free running voltage regulated inverter circuit as defined in claim 5 wherein said inductive reactor and said gate are series connected, the said series connection being connected in shunt with said first secondary winding whereby the reverse voltage characteristic of said inductive reactor induces switching in the transistors of said inverter when said gate is triggered into conduction.

7. A free running voltage regulated inverter as defined in claim 6 wherein said gate comprises a triac and a threshold responsive device to trigger said triac.

8. A DC to DC converter comprising a push-pull square wave inverter circuit in which two switching transistors are arranged in a self-oscillating arrangement in combination with a transformer to produce an alternating current in the windings of the transformer, means to simulate saturation in at least a portion of the core of said transformer common to said inverter circuit, said means to simulate including means to integrate the voltage applied to the windings of said transformer, said means to integrate comprising a resistance with impedance adjustment means connected in series with a capacitor, a series connected low impedance inductor with a linear inductive reactance and semiconductor gating means shunting said windings, means responsive to said means to integrate to activate said gating means including a semiconductor voltage breakdown diode interconnecting said capacitor and said gating means, means to rectify an output voltage derived from said transformer, and means to alter the time constant of said means to integrate in response to variations in the rectified output voltage, said means to alter including means to control said impedance adjustment means comprising a variable impedance transistor device whereby said integrator integrates the volt-time area of voltage applied to said windings and said gating means is activated at the attainment of a predetermined volt-time area as determined by said time constant, said gating means when activated shorting said windings and halting the increase in magnetic flux in said core thereby simulating saturation therein and inducing switching action in said inverter circuit.